C. L. LIBBY.
TOOL SUPPORT FOR LATHES.
APPLICATION FILED FEB. 6, 1908.

957,783.

Patented May 10, 1910.
2 SHEETS—SHEET 1.

WITNESSES:
W. M. Gantte
Olive Breeden

INVENTOR.
Charles L. Libby
BY
D. H. Lockwood
ATTORNEY.

UNITED STATES PATENT OFFICE.

CHARLES L. LIBBY, OF INDIANAPOLIS, INDIANA.

TOOL-SUPPORT FOR LATHES.

957,783. Specification of Letters Patent. Patented May 10, 1910.

Application filed February 6, 1908. Serial No. 414,500.

*To all whom it may concern:*

Be it known that I, CHARLES L. LIBBY, of Indianapolis, county of Marion, and State of Indiana, have invented a certain new and useful Tool-Support for Lathes; and I do hereby declare that the following is a full, clear, and exact description thereof, reference being had to the accompanying drawings, in which like numerals refer to like parts.

The object of this invention is to mount the tool support in turret lathes, for guiding drills, boring bars and the like, on a rod or means on the back of the lathe bed and independently of the carriage of the lathe, whereby the tool support may be moved into position for performing its function when desired and at other times be thrown back or out of the way of the use and operation of the carriage for other work of the lathe.

Figure 1:
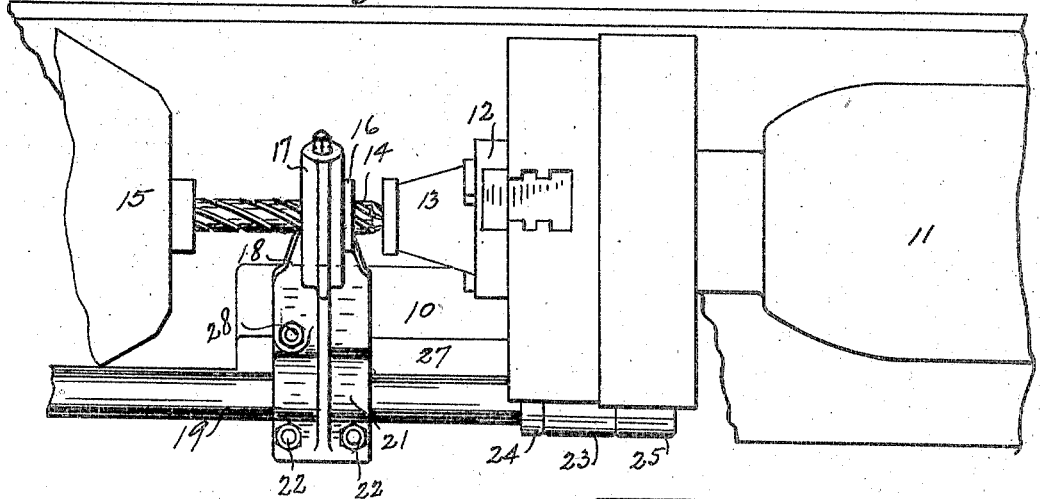
Figure 2:
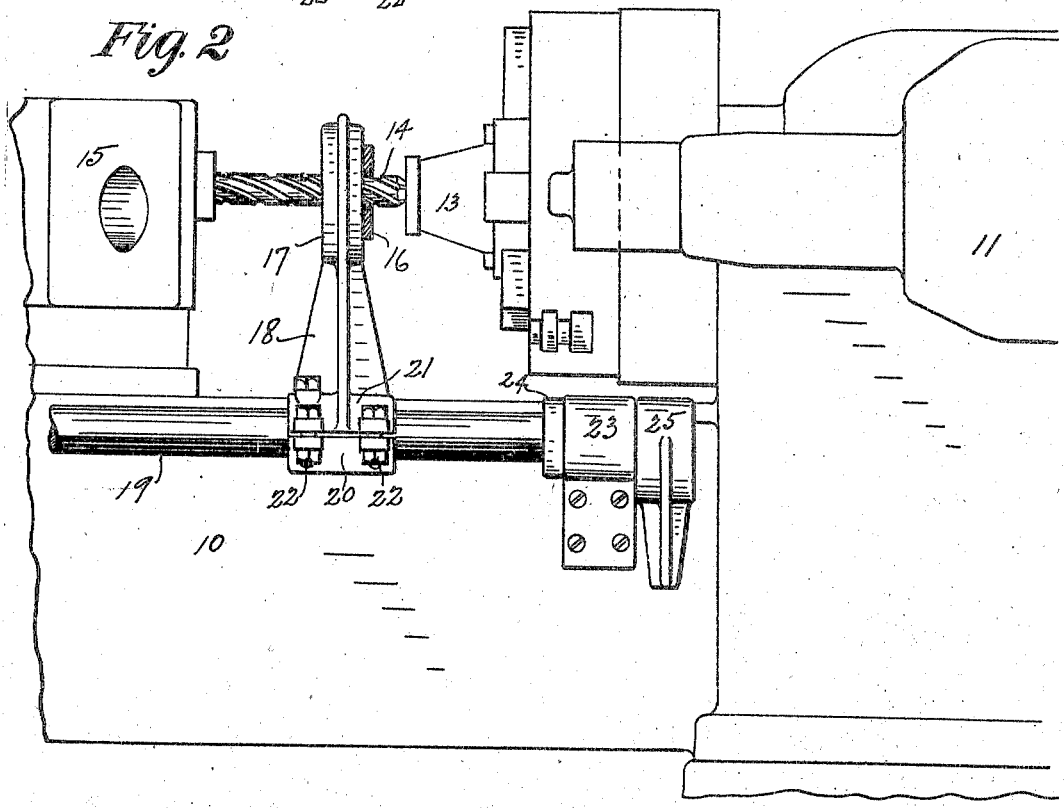
Figure 3:
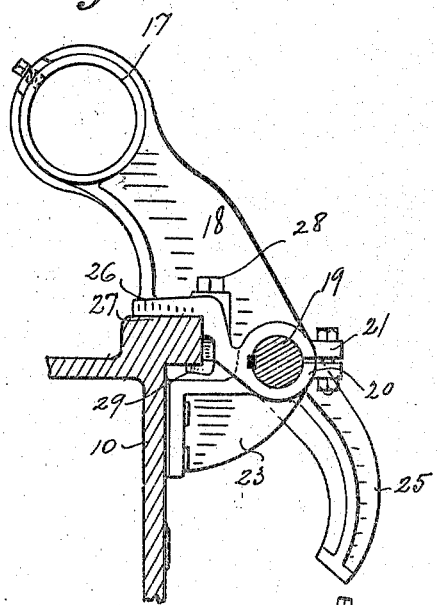
Figure 5:
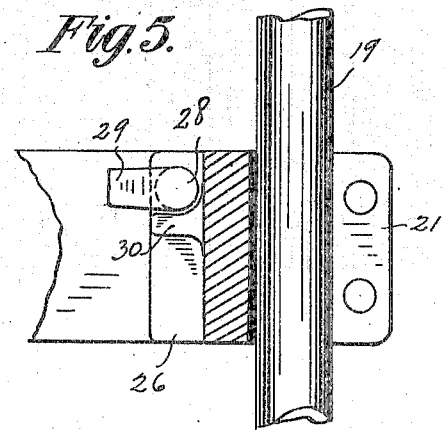
Figure 4:
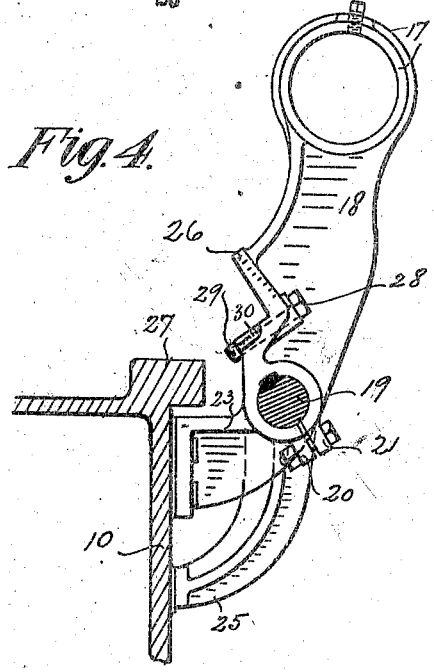
Figure 6:
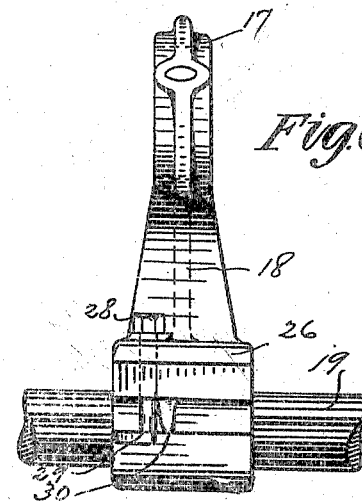

The full nature of the invention will be understood from the accompanying drawings and the following description and claims:

In the drawings Figure 1 is a plan view of a portion of a lathe provided with a support for a drill, boring bar or the like mounted in accordance with my invention, the said support being in working position and parts being broken away. Fig. 2 is a rear elevation of the central portion of said lathe, parts being broken away and parts in section. Fig. 3 is a vertical transverse section on the line 3—3 of Fig. 1, showing the tool support in working position. Fig. 4 is the same showing the tool support thrown back. Fig. 5 is a section on the line 5—5 of Fig. 4. Fig. 6 is a front elevation of the tool support and a portion of the rod on which it is mounted.

In the drawings there is shown a lathe bed 10 with a head stock 11 and chuck 12 revolubly mounted in the head stock for holding the work 13 which revolves while it is being treated by a non-revoluble drill or tool 14 mounted in the turret head 15. The outer end of the drill 14 is supported by a bushing 16 in the eye 17 of the tool support or guide 18. Said tool support is carried on the rod 19 by the integral split plates 20 and 21 which are clamped by the bolts 22.

The rod 19 is revolubly mounted in bearing brackets 23 secured to the bed 10 and held in place by collars 24 and stop projection 25 secured to the rod. The stop projection 25 extends downwardly and is adapted when the tool holder is thrown back to engage the side of the bed 10, as in Fig. 4. The tool holder is provided with a bearing shoulder 26 that rests flatly upon the slideway 27 on the bed 10 while the tool support is in working position, as shown in Fig. 3.

The tool holder is held down in its working position by the clamp bolt 28 that projects through a portion of the tool support to the side of the shoulder 26 and the slideway 27. The lower end of the clamp bolt 28 has a horizontally disposed extension 29 that, when said bolt is turned, the tool support being in its working position, said projection 29 will move in under the slideway 27, whereby it will coöperate with the shoulder 26 and the slideway 27 in holding said tool support in its proper working position. A stop lug 30 projects downwardly from the under side of the slideway 27 in position to limit and stop the rotating setting movement of the clamping bolt 28. Since the tool support consists of a single arm fulcrumed at the rear of the bed and extending up at an inclination, it is out of the way of and does not interfere with the movement of the carriage on the bed.

What I claim as my invention and desire to secure by Letters Patent is:

1. The combination of the bed of a lathe, a tool holder fulcrumed at one side of the bed of the lathe and consisting of a single arm with the upper and free end thereof formed to hold a tool and a shoulder on said tool holder near its fulcrum adapted to fit upon the upper surface of the same side of the lathe bed as the pivotal mounting of the tool holder and hold the tool holder in an inclined position with the free end over the lathe bed during work, and means for stopping the oscillatory movement of the tool holder for holding it out of the way when desired.

2. The combination of the bed of a lathe, a rod mounted at one side of the bed of the lathe, a tool holder mounted on said rod so as to be oscillatory thereon and slidable longitudinally thereof and consisting of a single arm with the upper and free end thereof formed to hold the tool and a shoulder on said tool holder near said rod adapted to fit and slide upon the side of the lathe bed with which said rod is connected and hold the tool holder in an inclined position with the free end over the lathe bed during work, and an extension of said tool holder below said rod adapted to engage the side of the lathe bed when the tool holder is turned back and limit such movement thereof.

In witness whereof, I have hereunto affixed my signature in the presence of the witnesses herein named.

CHARLES L. LIBBY.

Witnesses.
 OLIVE BREEDEN,
 V. H. LOCKWOOD.